Aug. 4, 1931.    T. R. HAGLUND    1,816,842
PROCESS FOR REFINING ORES OR PRODUCTS CONTAINING ALUMINUM OXIDE
Filed May 18, 1925
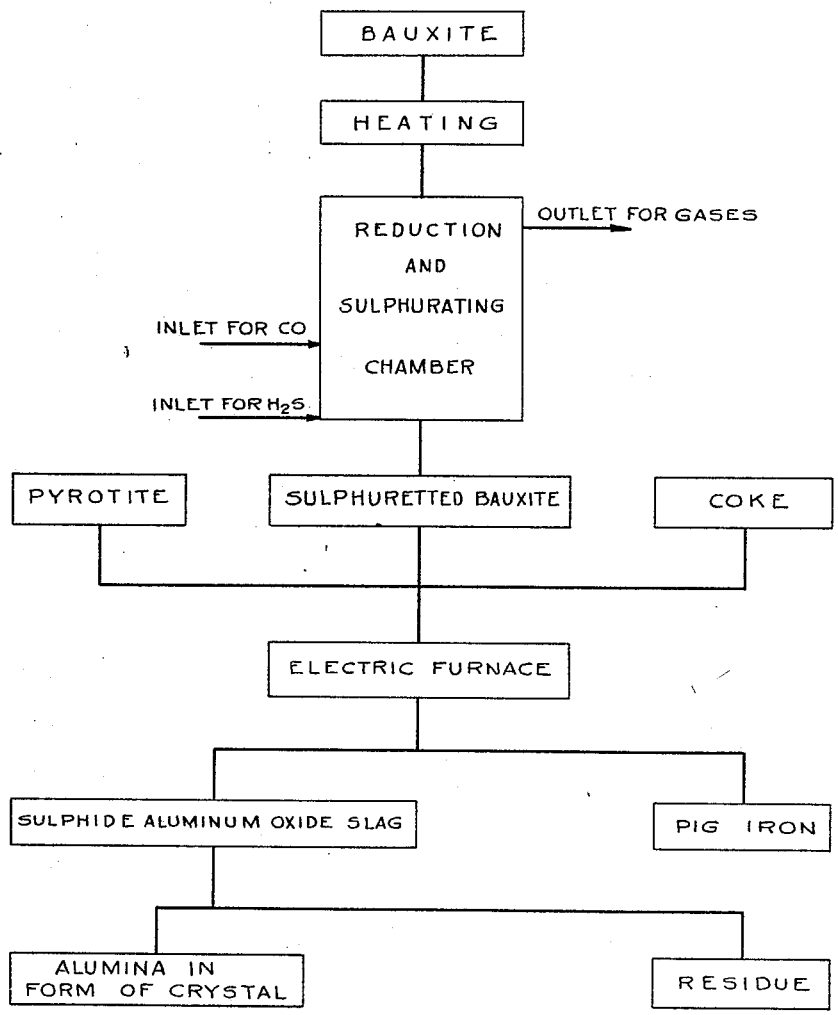

Patented Aug. 4, 1931

1,816,842

UNITED STATES PATENT OFFICE

TURE ROBERT HAGLUND, OF STOCKHOLM, SWEDEN, ASSIGNOR TO INTERNATIONAL PATENT CORPORATION, A CORPORATION OF MARYLAND

PROCESS FOR REFINING ORES OR PRODUCTS CONTAINING ALUMINUM OXIDE

Application filed May 18, 1925, Serial No. 31,211, and in Sweden June 2, 1924.

This invention relates to processes for refining ores or products containing aluminum oxide, for example of the kind described in United States Patent No. 1,569,483, in which the raw material containing aluminum oxide, such as bauxites, is smelted in an electric furnace together with reducing agents and in which undecomposed aluminum oxide at the smelting is dissolved in a slag containing a sulphide of aluminum, barium, magnesium, calcium or the like, which sulphide according to the present invention is at least partly formed during the smelting process itself by reaction between the corresponding oxides and a sulphide of a heavy metal, for instance by the formula:

$$Al_2O_3 + 3FeS + 3C = Al_2S_3 + 3Fe + 3CO$$

From the slag formed as above, the aluminum oxide is separated in any appropriate known manner; for example, in the manner clearly described in United States patent, Reissue No. 17,001.

The object of the present invention is to wholly or partly convert the iron-oxygen combinations in the aluminum oxide raw material into ferrous sulphide or other iron-sulphur combinations by a preliminary treatment. Through utilizing the content of iron oxide impurities in the raw material in this way, the amount of added heavy metal sulphide material, necessary for the subsequent smelting process for the production of the sulphide-aluminum oxide slag, may be considerably reduced and in some cases may be avoided altogether.

If the raw material contains a considerable amount of moisture, as bauxite usually does, it should first be calcined. This can be done either independently of or together with the conversion of the iron-oxygen combinations into ferrous sulphide or the like. In many cases it is also suitable to first reduce the iron-oxygen combinations to metallic iron and then subsequently make the latter react with sulphur or sulphurous materials. If the sulphurating agent added for the conversion of iron-oxygen combinations into ferrous sulphide is in itself a strong reducing agent, as for example is true of gaseous sulphuretted hydrogen, the raw material may be treated with advantage in hot condition with this gas, without first reducing the iron-oxygen combinations to metallic iron. However, in such a case it is preferable to first reduce the ferric combinations, at least to ferrous combinations; the consumption of sulphuretted hydrogen otherwise being unnecessarily high. The reaction between ferrous oxide and sulphuretted hydrogen generally follows the formula.

$$FeO + H_2S = FeS + H_2O.$$

In this manner the sulphur will be more completely utilized for the formation of ferrous sulphide than in a reaction between ferric oxide and sulphuretted hydrogen.

According to the present invention the treatment of the aluminum oxide raw material for the reduction of iron-oxygen combinations to iron or ferrous oxide is carried out in a reducing atmosphere, obtained either by heating the raw material together with a solid carbon reducing agent or by introducing a reducing gas such as CO; or in both ways, for example in a manner similar to that known in connection with the production of spongy iron. The formation of the iron-sulphur compound may take place simultaneously with the reduction, or, if the reduction is only partly carried through, the formation may be completed in another part of the furnace or apparatus.

This preliminary treatment of the raw material can, for instance, be carried through in a shaft furnace, the aluminum oxide raw material together with carbon reducing agents, being introduced in its upper part. If desired, the charging materials may be added wholly or partly in the form of briquettes of finely divided and intimately mixed ingredients. In the upper part of the furnace the bauxite is calcined by means of hot gases resulting from the combustion of carbon monoxide from the reduction zone of the furnace. Below the calcination and preheating zone a reducing atmosphere is kept, for example by incomplete combustion of carbon in air. The sulphurating agent, such as sulphur $H_2S$, $COS$, $CS_2$, or other sulphurous products, may also be admitted to this zone of the furnace. As a rule, however, it is more suitable to add the sulphurous gases at that part of the furnace where the major portion of the ferric oxide is reduced to ferrous oxide. Instead of admitting a gas the necessary gaseous sulphurating agent may be formed wholly or partly during the heating by the addition of pyrites or other sulphurous products capable of delivering at a comparatively low temperature the sulphurous gases necessary for converting the iron-oxygen compounds into ferrous sulphide or the like. The pyrites may be provided, for instance, as an ingredient in the aforementioned briquettes.

The admission of sulphur in the form of pyrites is specially convenient for the treatment of bauxites having a moderate or comparatively low percentage of iron-oxygen combinations, such as grey and white bauxites.

Among furnaces of other types that can be used for the process may be mentioned rotary furnaces. For this purpose several rotary furnaces may be arranged in series, suitably one below the other. The calcination and/or preheating can then be carried out in the first furnace by combustion of a carbon monoxide containing gas, and the reduction can take place in the second furnace, together with the formation of iron sulphide, or the latter can be effected in a third furnace.

Irrespective of whether a shaft furnace, rotary furnace or furnace of some other type is used, it may be arranged either independently of the electric furnace in which the materials later are to be smelted, or in direct combination therewith.

According to the present invention, the bauxite or the like, after the sulphuration of its iron content, may be smelted either with reducing agents alone or with added unsulphuretted aluminum oxide raw material as well as other sulphurous materials, such as pyrotite and barium sulphide.

In case additions of solid carbon reducing agents are used for the sulphuration of the iron content in the bauxite or the like, the amount of such additions should be so chosen that a part of the reducing agent is left in the product after the treatment to serve as a reducing agent during the subsequent smelting in the electric furnace.

In a preceding paragraph it was mentioned that the aluminum oxide raw material could be briquetted with the reducing agent and also with the sulphurous material in carrying out the preliminary treatment. It may be pointed out here that the briquetting also can be performed after such treatment, and other components of the charge for the smelting process can be added to these briquettes. In preparing the briquettes, generally used methods may be employed and binding agents such as tar, lime, clay, lignite, peat and others, may be utilized, together with mellowing means such as saw dust, charcoal and the like. As carbon reducing agents in the process anthracite, coke, charcoal, lignite, peat and similar materials may be used.

This process is especially suited for the treatment of bauxites rich in iron, but can also be used with advantage in the treatment of other bauxites, in which case the percentage of iron-oxygen combinations may be increased by the addition of iron ore. In many instances it also will be found advantageous to add barium sulphate or calcium sulphate or raw materials that contain such sulphates, for instance heavy spar. During the preliminary treatment these sulphates will be reduced to barium sulphide and calcium sulphide respectively.

The accompanying drawing is a flow sheet representing an embodiment of the process.

I claim:

1. The process of refining ores or products containing aluminum oxide, which comprises converting impurities of oxide of iron into sulphides of iron by treating said material, before fusing, in a heated condition in a reducing atmosphere with a gaseous sulphurating agent, and fusing the treated material together with a reducing agent.

2. The process of refining bauxite, which comprises adding materials rich in oxides of iron, converting the oxides of iron in the additions and the oxides of iron occurring as impurities in the bauxite into sulphides of iron by treating the mixture, before fusing, in a heated condition in a reducing atmosphere with a gaseous sulphurating agent, and forming a slag containing sulphide and aluminum oxide by fusing the treated material together with a reducing agent.

3. The process of refining ores or products containing aluminum oxide, which comprises converting impurities of oxide of iron into sulphides of iron by treating said material, before fusing, in a heated condition in a reducing atmosphere with a gaseous sulphurating agent, adding a reducing agent and material containing a metal sulphide, and fusing the mixture in an electric furnace.

4. The process of refining bauxite, which comprises reducing impurities of ferric oxide into ferrous oxide by heating the bauxite in a reducing atmosphere, treating the material, before fusing, with a gaseous sulphurating agent and fusing the treated material together with a carbon reducing agent.

5. The process of refining bauxite, which comprises converting iron oxide impurities into sulphides of iron by treating the bauxite in a solid heated condition with carbon monoxide and a gaseous sulphur compound.

6. The process of refining ores or products containing aluminum oxide, which comprises converting impurities of oxide of iron into sulphides of iron by treating said material, before fusing, in a heated condition with carbon monoxide and gases containing sulphur, and fusing the treated material together with a reducing agent.

7. The process of refining bauxite, which comprises converting iron oxide impurities into sulphides of iron by treating the bauxite, before fusing, in a heated condition with a gas containing both carbon monoxide and a sulphur compound, adding a carbon reducing agent and a material rich in sulphide of iron, and fusing the mixture in an electric furnace.

8. The process of refining ores or products containing aluminum oxide, which comprises at least partially reducing impurities of oxide of iron to metallic iron by heating the material in a reducing atmosphere, treating the material, before fusing, with a gaseous sulphurating agent, and fusing the treated material together with a reducing agent.

9. The process of refining ores or products containing aluminum oxide, which comprises converting impurities of oxide of iron into sulphides of iron by treating the ore, before fusing, in a heated condition and in the presence of a reducing agent with sulphuretted hydrogen, and fusing the treated material together with carbon.

10. The process of refining bauxite, which comprises converting iron oxide impurities into sulphides of iron by treating the bauxite, before fusing, in a heated condition and in the presence of solid carbon reducing agents with carbon monoxide and a gas containing a sulphurating agent, and fusing the treated bauxite together with a reducing agent.

11. The process of refining bauxite, which comprises converting impurities of iron oxide into sulphides of iron by treating the bauxite, before fusing, in a heated condition and in the presence of a reducing agent with a gaseous sulphurating agent formed at least in part by the addition of a material able to give off a gaseous sulphurating agent at a temperature below the fusing point of the bauxite, and fusing the treated materials together with a reducing agent.

12. The process of refining bauxite, which comprises converting impurities of iron oxide into sulphides of iron by treating the bauxite, before fusing, in a heated condition with a gas containing both carbon monoxide and a gaseous sulphurating agent formed at least in part during the treatment by the addition of iron pyrites, and fusing the treated mixture together with a reducing agent.

13. The process of refining bauxite, which comprises converting impurities of iron oxide into sulphides of iron by treating the bauxite, before fusing, in a heated condition in a reducing atmosphere with a gaseous sulphurating agent, forming a slag containing sulphide and aluminum oxide by fusing the treated material together with a reducing agent, and separating the aluminum oxide out of the slag.

In testimony whereof I affix my signature.
TURE ROBERT HAGLUND.